United States Patent
Tsujimoto et al.

(10) Patent No.: US 11,418,672 B2
(45) Date of Patent: Aug. 16, 2022

(54) IMAGE FORMING APPARATUS AND TEMPERATURE CONTROL METHOD

(71) Applicant: Konica Minolta, Inc., Tokyo (JP)

(72) Inventors: Takahiro Tsujimoto, Toyokawa (JP); Takeshi Tamada, Toyohashi (JP); Tianhua Xu, Toyokawa (JP); Hiroaki Takatsu, Nishio (JP); Katsuyuki Ikuta, Hamamatsu (JP); Akihiro Hayashi, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/998,408

(22) Filed: Aug. 20, 2020

(65) Prior Publication Data

US 2021/0058529 A1     Feb. 25, 2021

(30) Foreign Application Priority Data

Aug. 22, 2019   (JP) ............................. JP2019-152144

(51) Int. Cl.
*H04N 1/00* (2006.01)
(52) U.S. Cl.
CPC ....... *H04N 1/00986* (2013.01); *H04N 1/0097* (2013.01); *H04N 1/00724* (2013.01); *H04N 1/00888* (2013.01)

(58) Field of Classification Search
None
See application file for complete search history.

(56) References Cited

U.S. PATENT DOCUMENTS

| 6,178,657 | B1* | 1/2001 | Graff ...................... | G01B 7/026 |
| | | | | 33/1 BB |
| 2009/0302522 | A1* | 12/2009 | Fujimori .................. | B65H 3/06 |
| | | | | 271/9.08 |
| 2012/0093534 | A1* | 4/2012 | Wai ..................... | G03G 15/2046 |
| | | | | 399/69 |
| 2012/0237264 | A1* | 9/2012 | Hirayama .............. | G03G 15/10 |
| | | | | 399/237 |
| 2018/0047238 | A1* | 2/2018 | Ueoka ...................... | G07D 7/02 |
| 2019/0025738 | A1* | 1/2019 | Hasegawa .......... | G03G 15/2039 |

FOREIGN PATENT DOCUMENTS

JP     2019012174 A     1/2019

* cited by examiner

*Primary Examiner* — Lennin R Rodriguezgonzalez
(74) *Attorney, Agent, or Firm* — Cantor Colburn LLP

(57) ABSTRACT

An image forming apparatus, includes: a media sensor that detects a sheet type; a fixer that fixes the image on a sheet; a storage that stores a fixing temperature for each sheet type; and a hardware processor that controls power supplied to the fixer by pulse-width modulation (PWM) control and controls a temperature of the fixer to the fixing temperature corresponding to the sheet type detected by the media sensor.

17 Claims, 8 Drawing Sheets

FIG. 5

| SHEET TYPE \ BASIS WEIGHT (g/m²) | THIN PAPER 52 TO 59 | PLAIN PAPER 1 60 TO 90 | PLAIN PAPER 2 91 TO 105 | THICK PAPER 2 106 TO 120 | THICK PAPER 1 121 TO 157 | THICK PAPER 2 158 TO 209 | THICK PAPER 4 210 TO 256 | ... |
|---|---|---|---|---|---|---|---|---|
| PLAIN PAPER | 140 | 145 | 150 | 155 | 160 | 165 | 170 | |
| RECYCLED PAPER | 145 | 150 | 155 | 160 | 165 | 170 | 175 | |
| COATED PAPER | 150 | 155 | 160 | 165 | 170 | 175 | 180 | |
| ⋮ | | | | | | | | |

IMAGE FORMING APPARATUS AND TEMPERATURE CONTROL METHOD

CROSS REFERENCE TO RELATED APPLICATIONS

The present invention claims priority under 35 U.S.C. § 119 to Japanese Application No 2019-152144, filed on Aug. 22, 2019, the entire content of which is incorporated herein by reference.

BACKGROUND

Technological Field

The present disclosure relates to an image forming apparatus and a temperature control method.

Description of the Related Art

The image forming apparatus has a fixing device for fixing a toner image on a sheet. In the fixing device, it is necessary to change temperature (fixing temperature) according to the sheet type. In the past, therefore, users had to distinguish the difference in sheet types such as thin paper, plain paper, and thick paper, and set the information for the sheet type on the operation panel.

JP 2019-12174 A discloses a technique for obtaining information on the sheet type using a media sensor, thereby eliminating the need for the user to set the information on the sheet type and allowing control of the fixing temperature according to the information on the sheet type obtained by the media sensor.

However, in the technique described in JP 2019-12174 A, the temperature of the fixer is controlled by turning the halogen heater on and off, so that it has not been possible to finely control the temperature change. For example, when there are three types of sheets with different basis weights, such as plain paper A, plain paper B, and plain paper C, an appropriate fixing temperature can be set according to each sheet type, but the fixing device of JP 2019-12174 A is unable to finely control the temperature change. Therefore, even if the temperature of the fixer is controlled by ON/OFF control of the halogen heater to the fixing temperature of each of plain paper A, plain paper B, and plain paper C, the temperatures of the fixer for the three types of sheets are almost the same in the fixing apparatus of JP 2019-12174 A. In other words, even though the basis weight of the sheet is known using the media sensor, the fixing device of JP 2019-12174 A is unable to control the fixing temperature of the fixer according to the sheet type, causing insufficient image quality on the sheet where the fixing processing has been performed.

SUMMARY

The present disclosure has been devised in view of the above situation, and it is an object of the present disclosure to provide an image forming apparatus and temperature control method capable of controlling a temperature of a fixer to a fixing temperature which is set according to information on a sheet type obtained using a media sensor.

To achieve the abovementioned object, according to an aspect of the present invention, an image forming apparatus reflecting one aspect of the present invention comprises: a media sensor that detects a sheet type; a fixer that fixes the image on a sheet; a storage that stores a fixing temperature for each sheet type; and a hardware processor that controls power supplied to the fixer by pulse-width modulation (PWM) control and controls a temperature of the fixer to the fixing temperature corresponding to the sheet type detected by the media sensor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a table of fixing temperatures determined in accordance with basis weight and sheet type;

DETAILED DESCRIPTION OF EMBODIMENTS

Figure 1:
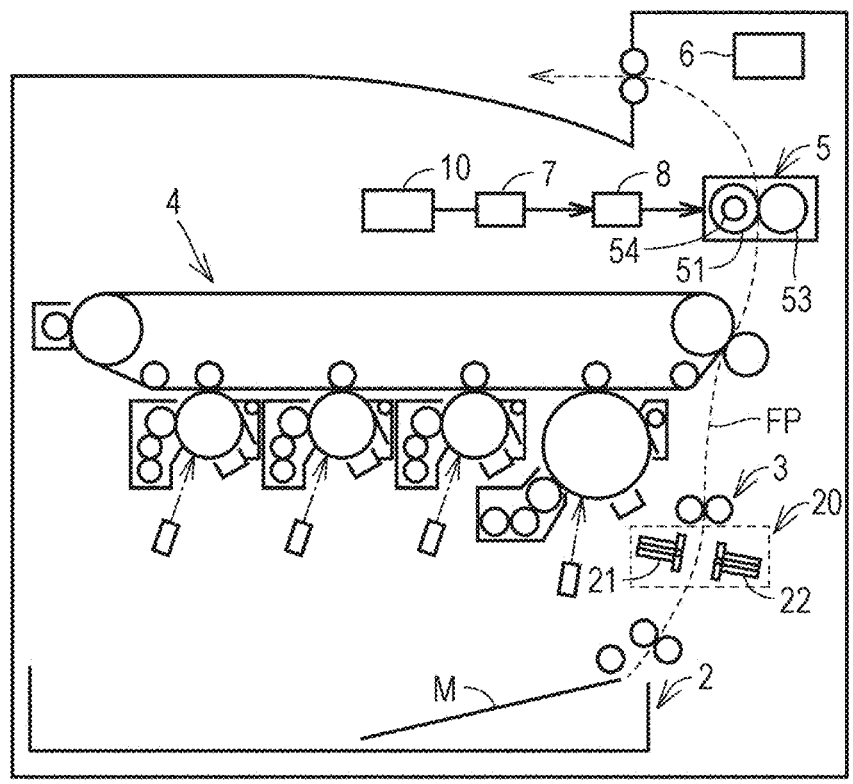
FIG. 1 illustrates an overall configuration of an image forming apparatus.

Hereinafter, one or more embodiments of a technical idea according to the present invention will be described with reference to the drawings. However, the scope of the invention is not limited to the disclosed embodiments. In the following description, the same components are denoted by the same reference numerals, and names, and have the same functions. Therefore, detailed description of such components will not be repeated.

First Embodiment

<Overall Configuration of Image Forming Apparatus>

FIG. 1 illustrates an overall configuration of an image forming apparatus 1. In FIG. 1, the image forming apparatus 1 is, for example, a copying machine, a printer, a facsimile, or a multifunctional machine having these functions, and prints an image on a sheet of print medium M (e.g., paper, film, sticker, and the like).

The image forming apparatus 1 generally includes a paper feeder 2, an ultrasonic sensor 20, a registration roller pair 3, an image forming unit 4, a fixer 5, an operation/input unit 6, a control unit 7, a power supply unit 8, and a storage 10. In the following, an operation of each component during a printing operation of the image forming apparatus 1 is described.

An unused print medium M is stacked on the paper feeder 2. The paper feeder 2 feeds the print medium M one after another to a conveyance path FP indicated by a broken line in FIG. 1. Upon discharging the print medium M, the paper feeder 2 transmits a signal E representing that the print medium M has been discharged to the control unit 7. The control unit 7 starts counting a timer upon reception of the signal E.

It takes time T until the print medium M reaches the ultrasonic sensor 20. Once the timer reaches time T, the control unit 7 determines that the print medium M has reached the ultrasonic sensor 20.

The registration roller pair 3 is disposed on the downstream side of the paper feeder 2 on the conveyance path FP. The registration roller pair 3 temporarily stops the print medium M sent from the paper feeder 2 and, then, sends the print medium M to a secondary transfer area at a predetermined timing.

On the conveyance path FP, the ultrasonic sensor 20 is disposed to detect a sheet type, a basis weight, and a thickness of the print medium M that is stopped by the registration roller pair 3. In the present embodiment, the sheet type and the like of the print medium M are detected using the ultrasonic sensor. Alternatively, the sheet type and the like of the print medium M may be detected using a piezoelectric sensor, a capacitive sensor, or the like. Of course, such sensors may be used in combination in the image forming apparatus 1.

The ultrasonic sensor 20 includes an emitting ultrasonic sensor 21 and a receiving ultrasonic sensor 22. The emitting ultrasonic sensor 21 emits ultrasonic waves to the receiving ultrasonic sensor 22. The receiving ultrasonic sensor 22 receives ultrasonic waves emitted from the emitting ultrasonic sensor 21. The frequency of the ultrasonic waves emitted from the emitting ultrasonic sensor 21 is 300 kHz in the present embodiment. Another ultrasonic sensor 20 that emits and receives ultrasonic waves in other wavelength ranges may also be used.

The emitting ultrasonic sensor 21 and the receiving ultrasonic sensor 22 are diametrically opposed to each other. The ultrasonic waves emitted from the emitting ultrasonic sensor 21 intersect the conveyance path FP before reaching the receiving ultrasonic sensor 22. When the print medium M is on the conveyance path FP on which the ultrasonic waves intersect, the emitted ultrasonic waves collide with the print medium M. Since the print medium M is a porous material formed by an aggregate of fibers, a portion of the colliding ultrasonic waves passes through the air inside the print medium M and reaches the receiving ultrasonic sensor 22.

That is, the emitted ultrasonic waves are reflected from, absorbed in, and diffused in the print medium M. The ultrasonic waves reflected from the surface of the print medium M become reflected waves and are not absorbed or diffused in the print medium M. The ultrasonic waves that reach the receiving ultrasonic sensor 22 after being attenuated by reflection, absorption, and diffusion become transmitted waves.

A degree to which the print medium M absorbs and diffuses the emitted ultrasonic waves is determined by the density of the fibers inside the print medium M, the thickness of the fibers, or the thickness of the print medium M. The ultrasonic sensor 20 outputs the attenuation amount of the transmitted wave received by the receiving ultrasonic sensor 22 to the control unit 7. The control unit 7 detects the density of the fibers inside the print medium M, the thickness of the fibers, or the thickness of the print medium M in accordance with the attenuation amount of the transmitted wave received by the input receiving ultrasonic sensor 22 and the angle of incidence at which the ultrasonic waves are emitted from the emitting ultrasonic sensor 21. The control unit 7 derives a basis weight, which is a weight per unit area of the sheet, in accordance with the density of fibers of the detected print medium M. The control unit 7 derives the sheet type in accordance with the detected fiber density inside the print medium M, the thickness of the fibers, or the thickness of the print medium M.

The print medium M, whose basis weight and sheet type are detected, is sent out to the secondary transfer area by the registration roller pair 3. The print medium M is conveyed from the image forming unit 4 and a toner image is transferred. The image forming unit 4 generates the toner image on an intermediate transfer belt, for example, by a well-known electrophotography method and a tandem method. The toner image is carried by the intermediate transfer belt and conveyed toward the secondary transfer area.

The print medium M is conveyed to the fixer 5 after the toner image is transferred. In the fixer 5, a heating roller 51 and a pressure roller 53 contact each other to form a nip. The heating roller 51 incorporates a plurality of heaters in a cylindrical cored bar.

Each heater is a halogen heater which is lit by a current supplied from the power supply unit 8. Further, the fixer 5 includes an electromagnetic induction coil (not illustrated), and the electromagnetic induction caused by the electromagnetic induction coil may cause a current to flow through a resistance provided inside the heating roller 51 and heats the heating roller 51.

The pressure roller 53 rotates under the control of the control unit 7. The heating roller 51 rotates following the rotation of the pressure roller 53. When the print medium M is fed into the nip, the print medium M is pressed by the heating roller 51 and the pressure roller 53, and is also heated by the heating roller 51. As a result, the toner transferred to the print medium M is fixed. The print medium M is sent out toward a paper discharge tray.

The fixer 5 includes a heater temperature detection unit 54. The heater temperature detection unit 54 is, for example, a thermistor. The heater temperature detection unit 54 detects the temperature of each heater in the heating roller 51 and outputs the detection result to the control unit 7. The temperature of each heater means the temperature of the fixer.

The operation/input unit 6 includes a numeric keypad, a touch panel, physical buttons, and the like. The operation/input unit 6 receives various kinds of information input by the user.

The control unit 7 comprehensively controls the entire image forming apparatus 1. The CPU included in the control unit 7 executes a program stored in a read-only memory (ROM) while using a random access memory (RAM) as a work area. In particular, the power supply to each heater is controlled in the present embodiment. Specifically, the control unit 7 controls the power supply unit 8 in accordance with the result detected by the ultrasonic sensor 20 such that the temperature of each heater in the heating roller 51 reaches a predetermined fixing temperature.

The power supply unit 8 rectifies and controls power supplied mainly from a commercial power supply to supply power to the image forming apparatus 1 including individual heaters. The storage 10 stores a table listing fixing temperatures determined in accordance with the basis weight and the sheet type. In accordance with the table and the attenuation amount detected by the ultrasonic sensor 20, the control unit 7 controls the power supply unit 8 so that the temperature of each heater becomes a fixing temperature in accordance with the basis weight and the sheet type. In the following, the configuration of the control unit 7, the power supply unit 8, and individual heaters are described.

<Circuit Configuration>

Figure 2:
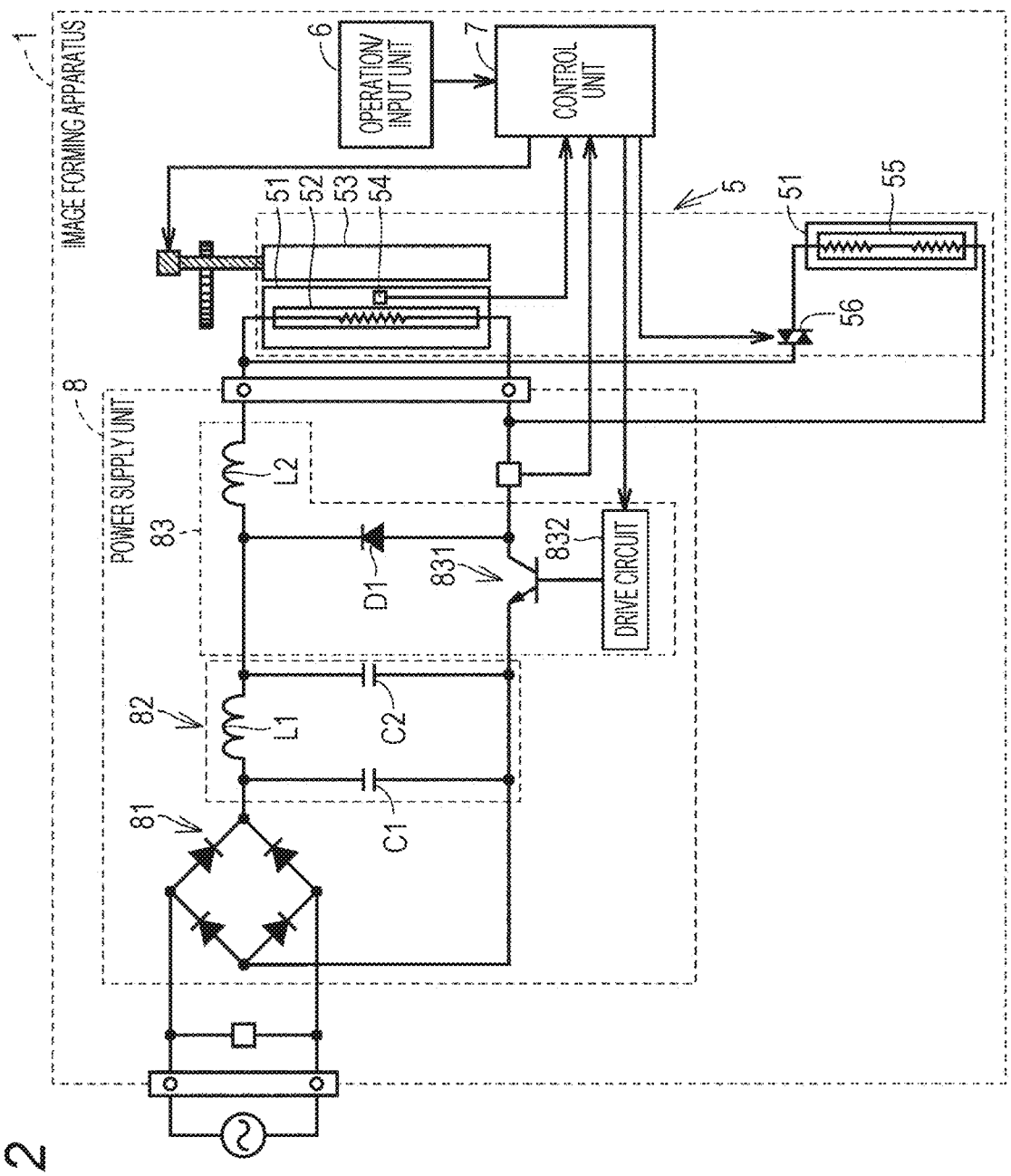
FIG. 2 illustrates a circuit configuration of the image forming apparatus.

FIG. 2 illustrates a circuit configuration of the image forming apparatus 1. FIG. 2 mainly illustrates the circuit configuration of the power supply unit 8 and the fixer 5. The power supply unit 8 includes a rectifier circuit 81, a noise filter 82, and a chopper circuit 83. The rectifier circuit 81 is connected to a commercial power supply and converts the AC power to DC power.

The fixer 5 includes a central heater 52 and an end heater 55 inside a heating roller 51. In FIG. 2, the central heater 52 and the end heater 55 (simply the heaters hereinafter) are illustrated separately for convenience of representation in the drawing, but in practice each heater is provided in the same heating roller 51. In the present embodiment, as illustrated in FIG. 2, the end heater 55 does not have resistance in a part corresponding to the central portion of the heating roller 51, and heats only the end portion of the heating roller 51. The end heater 55, however, may be a long heater having resistance also in the central portion. That is, the long heater has a portion for heating in the central portion of the heating roller 51 overlapping the central heater 52, and heats the heating roller 51 wider than the central heater 52. At this time, the central heater 52 is called a short heater as opposed to a long heater.

The noise filter 82 is, for example, a n-type filter, and is cascade-connected to the output side of the rectifier circuit 81. Specifically, the noise filter 82 includes a coil L1, a capacitor C1, and a capacitor C2. The coil L1 is connected in series to each heater. The capacitors C1 and C2 are connected in parallel to each heater.

The chopper circuit 83 is, for example, a step-down chopper circuit, and is cascade-connected to the output side of the noise filter 82. In this case, the chopper circuit 83 includes a coil (reactor) L2, a freewheeling element D1, a switching element 831, and a drive circuit 832. The coil L2 is connected in series between each heater and the coil L1.

The freewheeling element D1 is, for example, a diode, which is connected in parallel to each heater and is arranged closer to the noise filter 82 than the coil L2. More specifically, the freewheeling element D1 is arranged such that the cathode of the freewheeling element D1 is electrically connected between the coil L1 and the coil L2, and the anode of the freewheeling element D1 is electrically connected between each heater and the collector of the switching element 831.

Further, the switching element 831 is, for example, an insulated gate bipolar transistor (IGBT) or a metal-oxide-semiconductor field-effect transistor (MOS-FET), which is connected closer to the noise filter 82 side than the freewheeling element D1, and is connected in series with each heater.

More specifically, the switching element 831 is arranged such that the collector of the switching element 831 is electrically connected to each heater and the emitter of the switching element 831 is electrically connected to the output side of the rectifier circuit 81. The drive circuit 832 is connected to the gate of the switching element 831 and sets the duty ratio and drive frequency of the switching element 831 under the control of the control unit 7. Each heater is connected between the output terminals of the chopper circuit 83.

A triac 56 is a rectifier element that functions as a switch for switching the state of power supply to the end heater 55. The triac 56 is turned on when a current is applied to the gate. Specifically, the triac 56 is, for example, a phototriac coupler, and switches between an on state and an off state by a signal from the control unit 7. A thyristor having the same characteristics as the triac may be used as the switch.

The rectifier circuit 81 rectifies all waves of the AC power supplied from the commercial power supply to generate DC power. The noise filter 82 removes noise from the output current of the rectifier circuit 81. Here, the capacitors C1 and C2 of the noise filter 82 prevent leakage of high frequency components of the pulsed current, which flows through the switching element 831, to the commercial power supply side.

In supplying power to each heater, the control unit 7 inputs a control signal to the drive circuit 832. With the control signal, a time period in which at least each heater is turned on (i.e., a duty ratio) is generated. The drive circuit 832 generates a drive signal to turn on or off the switching element 831 at the duty ratio indicated by the control signal, and supplies the drive signal to the gate of the switching element 831.

The switching element 831 is driven at a frequency (e.g., 300 kHz) much higher than the frequency of the commercial power supply. In the present embodiment, the switching element 831 is driven at a frequency at least within a predetermined range from the frequency of 300 kHz. When the switching element 831 is turned on, the DC power generated by the rectifier circuit 81 flows to the coil L2 and each heater via the switching element 831. During this time, the coil L2 that is a reactance element, stores a part of power flowing through the coil L2 itself as magnetic energy.

On the other hand, when the switching element 831 is turned off, the magnetic energy stored in the coil L2 while the switching element 831 is on, is released as power and supplied to each heater. This current returns to the coil L2 via the freewheeling element D1 as a regenerative diode.

By the operation of the power supply unit 8 as described above, the waveform of the input current to each heater becomes close to a sine wave. Accordingly, the power factor of the power supply unit 8 improves and the harmonic current is reduced from the input current.

In the circuit configuration, the power supply to the end heater 55 is switched between the on state and the off state according to the size of the print medium M. For example, when fixing a small-sized print medium M (such as A4 paper placed longitudinally), fixing is performed without supplying power to the end heater 55 in order to prevent excessive temperature rise. On the other hand, when fixing a large print medium M (such as A3 paper), it is necessary to increase the temperature of the end heater 55, and fixing is performed with power being supplied to both the central heater 52 and the end heater 55. The triac 56 switches the power supply to the end heater 55 to the on state or the off state.

<Temperature Control of Fixer>

In the present embodiment, the control unit 7 can detect the basis weight and the sheet type of the print medium M by the ultrasonic sensor 20 before the fixing processing is performed by the fixer 5. Accordingly, the control unit 7 can acquire the fixing temperature based on the basis weight and the sheet type from the table stored in the storage 10.

However, even if it is possible to obtain the fixing temperature in accordance with the basis weight and sheet type, the temperature of the heating roller 51 cannot be the same fixing temperature obtained, unless the amount of power supplied to the central heater 52 and the end heater 55 by the power supply unit 8 can be finely adjusted. Therefore, the image forming apparatus 1 in the present embodiment controls the amount of power supplied to each heater more finely by performing the PWM control with the switching element 831.

The control unit 7 controls the amount of power supplied to the heater by adjusting the duty ratio of the switching element 831. The switching element 831 switches between the on state and the off state at high speed. While the switching element 831 is on, the power supply unit 8 supplies power to each heater. While the switching element 831 is off, the power supply unit 8 does not supply power to each heater.

The control unit 7 controls the duty ratio, which is the ratio of the on-state period within one period (a period in which one on-state and adjacent one off-state are summed), while the switching element 831 periodically switches between the on state and the off state at high speed. The higher the duty ratio, the larger the amount of power supplied to the heater. The lower the duty ratio, the smaller the amount of power supplied to the heater. In other words, the control unit 7 controls the temperature of each heater by controlling the high duty ratio.

Figure 3:
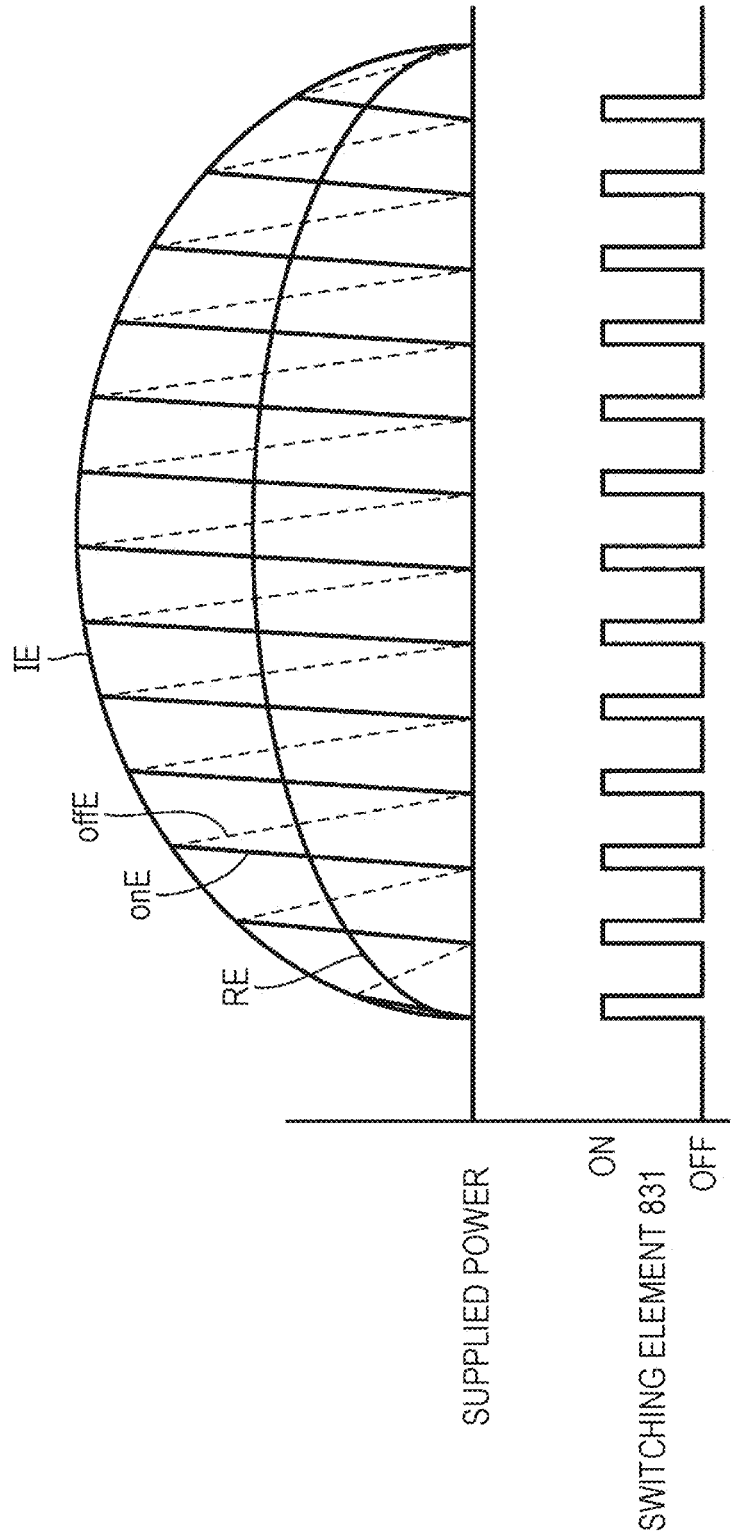
FIG. 3 illustrates supplied power when PWM control is performed at a low duty ratio.

FIG. 3 illustrates supplied power when PWM control is performed at a low duty ratio. The rectangular wave illustrated in the lower part of FIG. 3 indicates that the switching element 831 periodically switches between the on state and the off state. The mountain-shaped curve illustrated in the upper part indicates the amount of power supplied to each heater, that is, the supplied power.

The solid line onE indicates the amount of power supplied to each heater while the switching element 831 is in the on state. During the on state, the amount of power supplied to each heater increases. In contrast, the broken line offE indicates the amount of power supplied to each heater while the switching element 831 is in the off state. During the off state, the power supplied to each heater gradually decreases due to the residual power.

The curve IE indicates an input power amount to each heater. The input power amount is a power value based on the maximum value of the power supplied to each heater. In contrast, the curve RE indicates an effective power amount of each heater. The effective power quantity is the power quantity determined as the effective value of the power quantity supplied to each heater. In other words, the switching element 831 repeats the on state and the off state at high speed, so that the input power indicated by the curve IE does not indicate the effective power, but the power indicated by the curve RE is the effective value of the power supplied to the heater.

Figure 4:
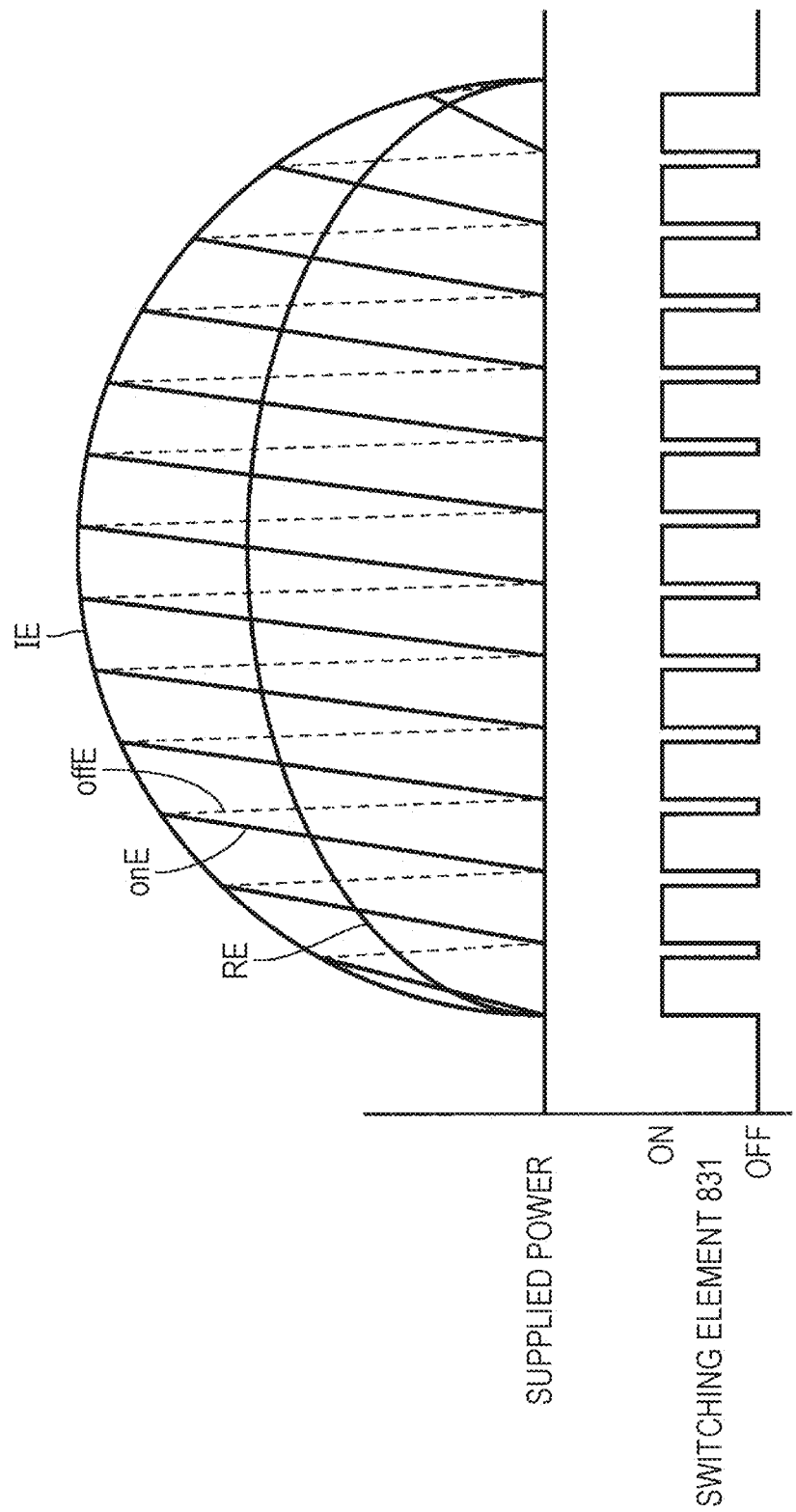
FIG. 4 illustrates supplied power when PWM control is performed at a high duty ratio.

FIG. 4 illustrates the supplied power when PWM control is performed at a high duty ratio. In FIG. 4, since the PWM control is performed at a high duty ratio, the period when the switching element is in the on state is longer than the period when the switching element is in the on state in FIG. 3. Accordingly, the supply time to each heater indicated by the solid line onE increases, and the input power amount indicated by curve IE and the effective power amount indicated by curve RE also increase.

Thus, as illustrated in FIGS. 3 and 4, the control unit 7 can finely control the duty ratio of the switching element 831, so that the effective amount of power supplied to each heater is finely controlled.

On the other hand, if the power supply to the heaters is controlled only by ON/OFF control without using the PWM control, the control unit 7 cannot finely control the amount of effective power supplied to the heaters. In other words, the ON of the ON/OFF control is the state of 100% duty ratio, and the OFF of the ON/OFF control is the state of 0% duty ratio, so the control unit 7 is unable to set the duty ratio of the switching element 831 to the ratio between ON and OFF.

Use of the PWM control allows the control unit 7 to control the temperature of each heater in units of ±5° C. Further, the control unit 7 may determine the width of the ON time of the PWM control in accordance with the sheet type detected by the high frequency sensor.

<Fixing Temperature Determined in Accordance with Basis Weight and Sheet Type>

FIG. 5 is a table illustrating fixing temperatures determined in accordance with the basis weight and the sheet type. Using the table illustrated in FIG. 5, the control unit 7 controls the temperature of each heater so that the temperature of each heater can be a fixing temperature according to the basis weight and sheet type detected by the ultrasonic sensor 20. The fixing temperature is generally the temperature at which the toner can be fixed on the print medium M most stably.

The storage 10 stores the fixing temperature itself according to the basis weight and the sheet type of the print medium M, but may store values such as the heating time and the duty ratio of each heater so as to control to the fixing temperature without storing the fixing temperature itself. In other words, if the storage 10 stores information for controlling the fixing temperature according to the basis weight and the sheet type of the print medium M, the control unit 7 can set the temperature of the fixer 5 to the fixing temperature.

The control unit 7 uses the ultrasonic sensor 20 to read out from the table the fixing temperature according to the basis weight and the sheet type of the guided print medium M.

For example, the control unit 7 may detect by the ultrasonic sensor 20 that the sheet type of the print medium M is "plain paper" and that the basis weight is 70 g/m2. The control unit 7 refers to the table illustrated in FIG. 5 and reads out that the fixing temperature of the fixer 5 according to the print medium M is 145° C. The control unit 7 controls the duty ratio of the switching element 831 of the power supply unit 8 so that the temperature of each heater can be set to 145° C.

In the same procedure, when the sheet type of the print medium M is "recycled paper" and the basis weight is detected to be 70 g/m2, the control unit 7 controls the temperature of each heater to 150° C.

As illustrated in the table of FIG. 5, the fixing temperature changes finely in ±5° C. increments depending on the basis weight and the sheet type. Therefore, if the control unit 7 controls the power supplied to the fixer 5 by the ON/OFF control without controlling power by the PWM control, it may not be possible to control to the fixing temperature listed in the table of FIG. 5. In other words, if the power supplied to the fixer 5 is controlled by the ON/OFF control, the temperature may not be controlled appropriately for the paper type, and the toner may not be fixed or the paper may be wrinkled due to excessive moisture evaporation from the paper. These problems, however, can be restricted by the embodiment of the present invention.

<Effect of Electromagnetic Noise on Receiving Ultrasonic Sensor>

Figure 6:
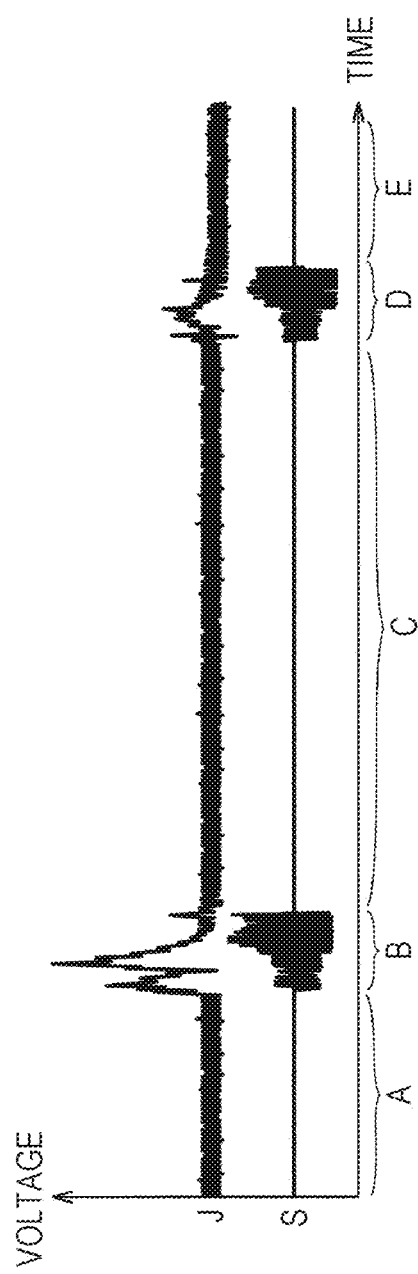
FIG. 6 is a diagram for explaining the effect of electromagnetic noise on a receiving ultrasonic sensor.

FIG. 6 is a diagram for explaining the effect of electromagnetic noise on the receiving ultrasonic sensor 22. When driven, the switching element 831 is repeatedly turned on and off at 300 kHz to rapidly change the current. The rapid change in the current causes high-frequency electromagnetic noise, which is emitted from the switching element 831.

When the electromagnetic noise reaches the receiving ultrasonic sensor 22, the ultrasonic transducer included in the receiving ultrasonic sensor 22 causes a malfunction due to the electromagnetic noise. The ultrasonic transducer is an ultrasonic transducer such as a piezoelectric ceramic that converts a received 300 kHz ultrasonic wave into a received signal. Therefore, the received signal, converted from 300 kHz ultrasonic wave, is easily affected by the electromagnetic noise at 300 kHz which is closer in frequency. The receiving ultrasonic sensor 22 falsely detects the received signal due to the malfunction of the ultrasonic transducer, so that the correct result cannot be obtained.

FIG. 6 illustrates the waveform of a received signal J of the receiving ultrasonic sensor 22 and the waveform of a PWM signal S of the switching element 831 detected by the oscilloscope. The vertical axis represents the voltage value, and the horizontal axis represents the time axis.

The receiving ultrasonic sensor 22 receives the ultrasonic waves emitted from the emitting ultrasonic sensor 21 during the entire period indicated in period A to period E. The ultrasonic transducer of the receiving ultrasonic sensor 22 converts the received ultrasonic wave into the received signal J. In period A, period C, and period E, the ultrasonic transducer converts the ultrasonic waves emitted from the emitting ultrasonic sensor 21 into the received signal J without being affected by the electromagnetic noise from the switching element 831. Therefore, as illustrated in FIG. 6, the received signal J in period A, period C, and period E is detected by the oscilloscope as a stable and constant waveform.

On the other hand, the switching element 831 is not driven and emits no electromagnetic noise in period A, period C, and period E, while being driven and emitting the electromagnetic noise in period B and period D in order to heat each heater. FIG. 6 illustrates the waveform of the PWM signal S detected by the oscilloscope in period B and period D.

When driven, the switching element 831 repeatedly turns the switch on and off at high speed, emitting electromagnetic noise, and the electromagnetic noise affects the receiving ultrasonic sensor 22. The waveform of the received signal J in period B and period D in FIG. 6 is disturbed by the electromagnetic noise from the switching element 831.

As described above, when the print medium M reaches between the emitting ultrasonic sensor 21 and the receiving ultrasonic sensor 22 at the timing when the receiving ultrasonic sensor 22 is affected by the electromagnetic noise, the receiving ultrasonic sensor 22 is unable to properly convert the transmitted wave that has passed through the print medium M into a received signal. In the following, a method to avoid such a problem is described.

<Avoiding False Detection>

Figure 7:
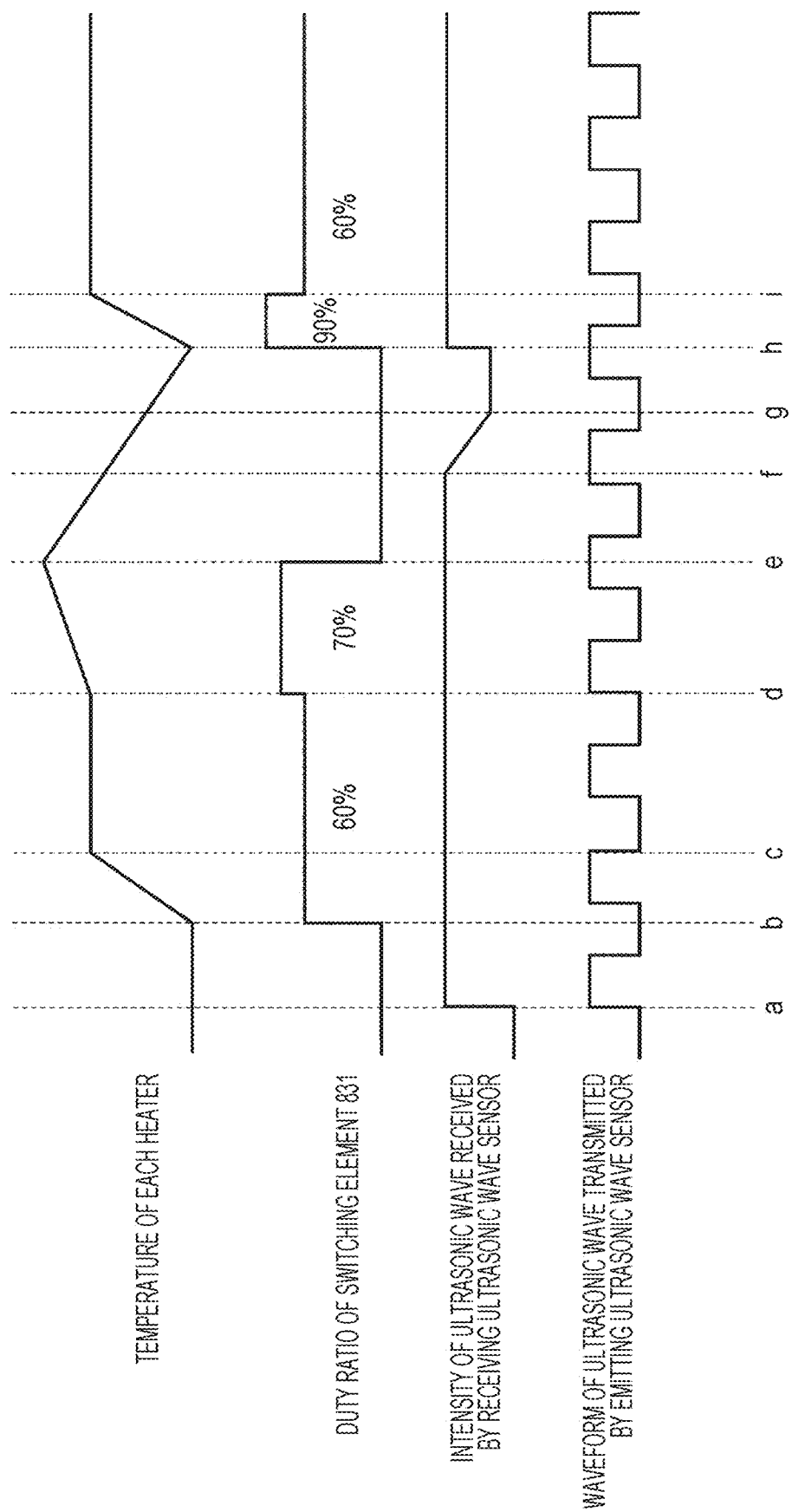
FIG. 7 is a schematic timing chart illustrating an operational relationship between an ultrasonic sensor and a switching element.

FIG. 7 provides a conceptual explanation of a method for avoiding false detection due to the electromagnetic noise generated by the receiving ultrasonic sensor. FIG. 7 is a schematic timing diagram illustrating an operational relationship between the ultrasonic sensor 20 and the switching element 831. From above, the temporal change of the temperature of each heater, the temporal change of the duty ratio of the switching element 831, the temporal change of the intensity of the ultrasonic wave received by the receiving ultrasonic sensor 22, and the temporal change of the waveform of the ultrasonic wave emitted by the emitting ultrasonic sensor 21 are illustrated in the same time series. In FIG. 7, respective temporal changes described above are only schematically illustrated and are different from the actual waveform. Further, the duty ratio, the time interval, and the like are merely examples.

First, prior to time a in FIG. 7, the paper feeder 2 ejects the print medium M, and transmits a signal E to the control unit 7 along with the ejection. The control unit 7 that has received the signal E can determine in advance when the print medium M would reach the ultrasonic sensor 20 from the time the signal E is received. In FIG. 7, the print medium M reaches the ultrasonic sensor 20 at time f.

In the following, description is given in time series. At time a, the emitting ultrasonic sensor 21 starts emitting ultrasonic waves. After time a, the emitting ultrasonic sensor 21 continues to emit ultrasonic waves. In FIG. 7, for the sake of convenience, the ultrasonic waves emitted from the emitting ultrasonic sensor 21 are represented by schematic irregularities, but the actual ultrasonic waves are emitted at 300 kHz. At time a, the ultrasonic waves are emitted, and the receiving ultrasonic sensor 22 receives the ultrasonic waves and detects the intensity of the received ultrasonic waves.

At time b, the switching element 831 starts driving at a duty ratio of 60% to heat each heater. The temperature of each heater begins to rise at time b and is kept constant at time c.

At time b, the switching element 831 is driven and emits electromagnetic noise, and the receiving ultrasonic sensor 22 is affected by the electromagnetic noise. However, at time b, the ultrasonic sensor 20 does not detect the print medium M, so that there is no need to consider the effect of the electromagnetic noise of the switching element 831.

The control unit 7 controls the duty ratio of the switching element 831 to increase to 70% at time d, which is a predetermined period before time fat which the print medium M reaches the ultrasonic sensor 20. This control is to prepare for turning off the switching element 831, which is described later. Accordingly, the temperature of each heater starts rising at time d.

The control unit 7 turns off the switching element 831 at time e, which is a predetermined period before time f at which the print medium M reaches the ultrasonic sensor 20. Since the print medium M reaches the ultrasonic sensor 20 at time f, the ultrasonic sensor 20 may falsely detect the type of the print medium M due to the effect of the electromagnetic noise of the switching element 831. Therefore, at the timing of time e when the print medium M approaches the ultrasonic sensor 20, the control unit 7 turns off the switching element 831 to avoid false detection of the ultrasonic sensor 20.

Therefore, the control unit 7 turns the switching element 831 to the off state earlier than time f, which is calculated in accordance with the signal E, by a predetermined period (a period from time e to time f). Accordingly, the receiving ultrasonic sensor 22 is not affected by the electromagnetic noise. Since the switching element 831 is turned off, the power supply to each heater is stopped, and the temperature of each heater starts to drop from time e.

At time f, the print medium M discharged from the paper feeder 2 reaches the ultrasonic sensor 20. Once the print medium M has reached, the intensity of the ultrasonic waves received by the receiving ultrasonic sensor 22 decreases gradually depending on the area of interception over the receiving ultrasonic sensor 22. Since the print medium M is fed on the path, which extends until the emitted ultrasonic waves reach the receiving ultrasonic sensor 22, and interferes the path, the emitted ultrasonic waves are reflected from, absorbed in, and diffused in the print medium M. Accordingly, the transmitted waves that reach the receiving ultrasonic sensor 22 gradually weaken.

At time g, the print medium M reaches to a position between the receiving ultrasonic sensor 22 and the emitting ultrasonic sensor 21. The transmitted wave reaching the receiving ultrasonic sensor 22 is fixed at a constant intensity. The receiving ultrasonic sensor 22 transmits the intensity to the control unit 7, and the control unit 7 reads the basis weight and the sheet type of the print medium M from the table stored in the storage 10.

At time h, the control unit 7 controls the duty ratio of the switching element 831 in accordance with the intensity of the transmitted wave received by the receiving ultrasonic sensor 22 and the temperature profile stored in the storage 10. Here, the control unit 7 drives the switching element 831 at a duty ratio of 90%. Accordingly, the lowered temperature of each heater is raised to a predetermined temperature.

Further, at time h, the print medium M is sent to the image forming unit 4 by the registration roller pair 3. Accordingly, the intensity of the ultrasonic wave received by the receiving ultrasonic sensor 22 becomes higher again.

At time i, the heater temperature detection unit 54 transmits, to the control unit 7, to inform that the temperature of each heater has risen to a predetermined temperature, and the control unit 7 returns the duty ratio to 60%. Accordingly, the temperature of each heater is maintained at a constant temperature.

As described above, in the image forming apparatus 1 of the present embodiment, during the period from time f to time h when the print medium M reaches a position between the receiving ultrasonic sensor 22 and the emitting ultrasonic sensor 21, the control unit 7 turns off the switching element 831 and prevents false detection of the basis weight and the sheet type of the print medium M by the ultrasonic sensor 20.

The switching element 831 is set to the off state from time e instead of time f only because that the control unit 7 leaves the switching element 831 in the off state with a margin so as not to allow emitting the electromagnetic noise.

Another avoidance technique, which is conceivable is to make the frequency of the switching element 831 and the frequency of the ultrasonic sensor 20 not coincide with each other. For example, if the frequency of the switching element 831 varies from 300 kHz to a predetermined range, the ultrasonic transducer of the receiving ultrasonic sensor 22 is not affected by the electromagnetic noise from the switching element 831.

Further, the receiving ultrasonic sensor 22 may be disposed at a distance that the electromagnetic noise emitted by the switching element 831 does not reach. Accordingly, the ultrasonic transducer of the receiving ultrasonic sensor 22 is not affected by the electromagnetic noise from the switching element 831.

Furthermore, even in the period from time f to time h when the print medium M reaches between the receiving ultrasonic sensor 22 and the emitting ultrasonic sensor 21, the control unit 7 may supply power to the fixer 5 by the ON/OFF control without using the switching element 831. Accordingly, the switching element 831 does not emit the electromagnetic noise, and the ultrasonic transducer of the receiving ultrasonic sensor 22 is not affected by the electromagnetic noise.

<How to Control Power Supply to Each Heater>

Figure 8:
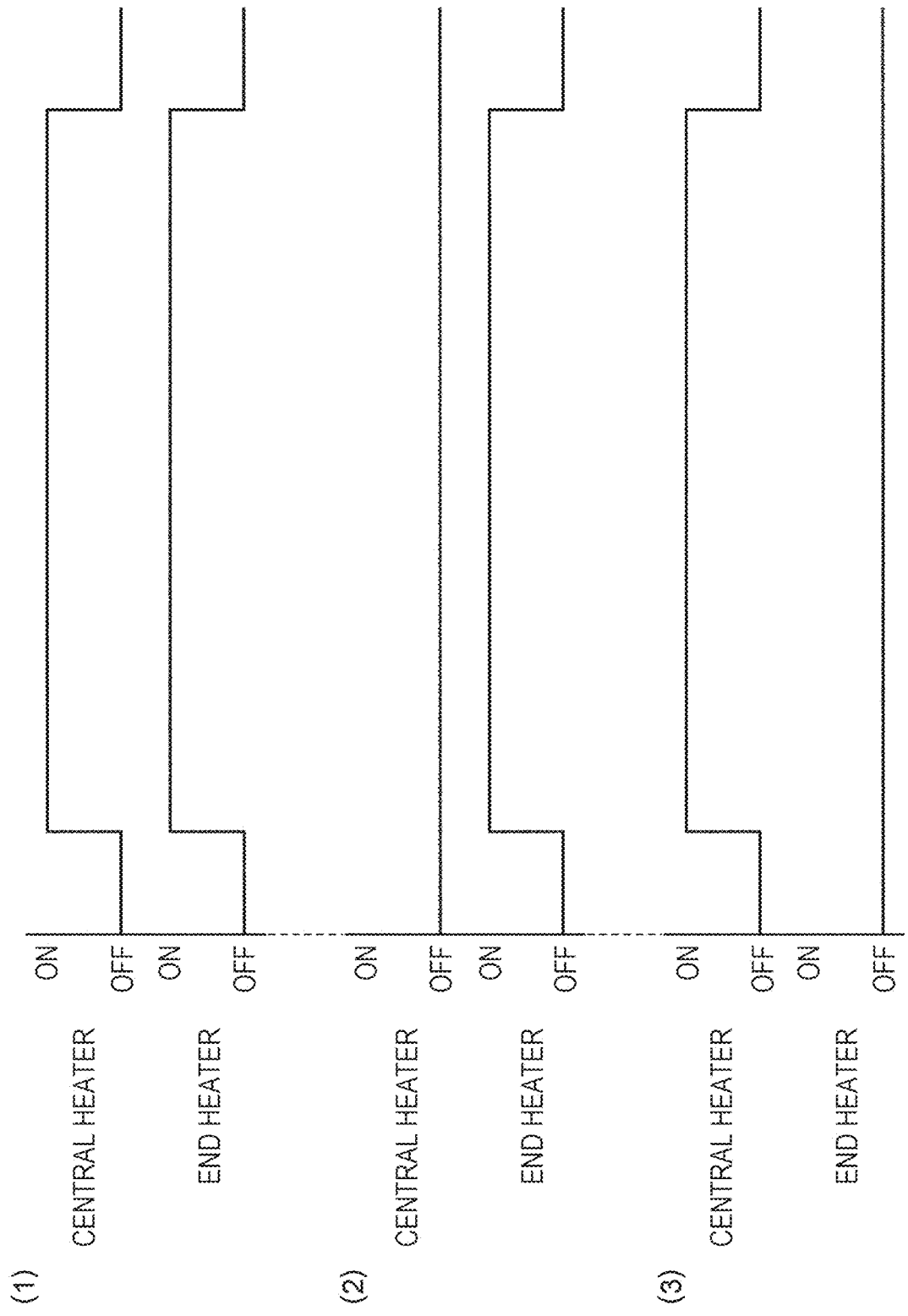
FIG. 8 illustrates a method for controlling power supply to each heater.

FIG. 8 illustrates a method for controlling power supply to each heater. The image forming apparatus 1 of the present embodiment includes a central heater 52 and an end heater 55 as illustrated in FIG. 2. Of course, the central heater 52 may be a short heater, and the end heater 55 may be a long heater.

In the image forming apparatus 1 of the present embodiment, the control unit 7 has been described as supplying power to each heater by controlling the duty ratio of the switching element 831, but it is not necessary to always supply power to both heaters, and the power may be supplied to one or both of the heaters.

As illustrated in (1) of FIG. 8, the power may be supplied to the central heater 52 and the end heater 55 or to both the short and long heaters.

As illustrated in (3) of FIG. 8, the power may be supplied only to the central heater 52 or the short heater.

The control unit 7 switches between the state (1) of FIG. 8 and the state (3) of FIG. 8 using the triac 56.

Without using the triac 56, other switches may be used to supply power only to the end heater 55 or the long heater, as illustrated in (2) of FIG. 8.

SUMMARY

As described above, the image forming apparatus 1 according to the present embodiment includes the media sensor that detects the sheet type, the fixer 5 that fixes the image on the sheet, and the storage 10 that stores the fixing temperature for each sheet type. The image forming apparatus 1 according to the present embodiment includes the control unit 7 that controls the power supplied to the fixer 5 by the PWM control in order to control the temperature of the fixer 5 to the fixing temperature corresponding to the sheet type detected by the media sensor. Accordingly, since the power supplied to the fixer 5 is controlled by the PWM control, the temperature of the fixer 5 can be precisely controlled to the fixing temperature that is set according to the information on the sheet type obtained using the media sensor, and the image quality on the sheet in which the fixing processing has been performed can be improved.

Further, the fixer 5 includes the heater that generates heat by resistance heating. Accordingly, the sheet can be heated using a heater such as a halogen heater that generates heat by resistance heating.

Further, the fixer 5 has a heater that generates heat by induction heating. Accordingly, the sheet can be heated using a heater such as an induction heating (IH) heater that generates heat by induction heating.

In addition, the PWM control is performed by high frequency chopping control.

Accordingly, the PWM control can be performed using the IGBT or the like.

Further, the media sensor is a high frequency sensor. Accordingly, a capacitance sensor or the like may be used as the media sensor.

The high frequency sensor is an ultrasonic sensor. Accordingly, the ultrasonic sensor 20 may be used as the media sensor.

Furthermore, the wavelength range used by the high frequency sensor may be a wavelength range that does not overlap the wavelength range of noise generated by the PWM control. Accordingly, it is possible to prevent the ultrasonic sensor 20 from being affected by electromagnetic noise.

The high frequency sensor may be located at a position separated by a predetermined distance from the switching element that performs the PWM control. Accordingly, it is possible to prevent the ultrasonic sensor 20 from being affected by electromagnetic noise.

Further, the control unit 7 may stop the power control of the PWM control when the high frequency sensor detects the sheet type. Accordingly, it is possible to prevent the electromagnetic noise from being generated in the ultrasonic sensor 20.

Further, the control unit 7 may control the power supplied to the fixer 5 by ON/OFF control when the power control by the PWM control is stopped. Accordingly, the generation of the electromagnetic noise at the ultrasonic sensor 20 can be prevented, and the power can be supplied to each heater.

Furthermore, the fixer 5 further includes the temperature sensor that measures the temperature of the fixer 5 and records the temperature profile, and the control unit 7 may control the power supplied to the fixer 5 in accordance with the temperature profile recorded by the temperature sensor after the high frequency sensor detects the sheet type. Accordingly, it is possible to increase the temperature of each heater that has been efficiently lowered in accordance with the temperature profile.

Further, the control unit 7 may control the power supplied to the fixer 5 so as to heat the fixer 5 for a predetermined period before stopping the power control of the PWM control. Accordingly, the temperature of each heater is increased in advance, and the degree of drop of the temperature after the power control is stopped can be reduced.

Further, the fixer 5 includes a plurality of heaters, and the control unit 7 may supply power to any one of the plurality of heaters in heating the fixer 5 for a predetermined period. Accordingly, the power is selectively supplied to one or both of the heaters.

Further, the control unit 7 may control the ON time of the PWM control in accordance with the sheet type detected by the high frequency sensor. Accordingly, the temperature of each heater can be controlled in accordance with the detected sheet type.

Further, the wavelength range of the noise generated by the PWM control may be within a predetermined range from 300 kHz. The wavelength range used by the high frequency sensor may be within a predetermined range from 300 kHz. Accordingly, the high frequency sensor or the switching element 831 within a predetermined range from 300 kHz can be used. The wavelength range used by the high frequency sensor and the wavelength range of the noise generated by the PWM control are not limited to 300 kHz. That is, what should be considered is the possibility of changing the detection result of the high frequency sensor depending on the wavelength range of noise, and the numerical value is not limited. Alternatively, a commonly-used wavelength range of 10 kHz, 20 kHz, or the like may be used.

Further, the temperature control method according to the present embodiment is used in the image forming apparatus 1 including the ultrasonic sensor 20 that detects the sheet type, the fixer 5 that fixes the image on the sheet, and the storage 10 that stores the fixing temperature for each sheet. The temperature control method includes detecting the sheet with the ultrasonic sensor 20, and controlling the temperature of the fixer 5 to the fixing temperature corresponding to the detected sheet type and controlling the power supplied to the fixer 5 by the PWM control. Accordingly, since the power supplied to the fixer 5 is controlled by the PWM control, it is possible to control the temperature of the fixer 5 to the fixing temperature set according to the sheet type information acquired using the media sensor, and the image quality on the sheet on which the fixing process is performed can be improved.

Although embodiments of the present invention have been described and illustrated in detail, the disclosed embodiments are made for purposes of illustration and example only and not limitation. The scope of the present invention should be interpreted by terms of the appended claims rather than by the foregoing description, and is intended to include all modifications within the meaning and scope equivalent to the scope of the claims.

What is claimed is:

1. An image forming apparatus, comprising:
a media sensor that detects a sheet type;
a fixer that fixes the image on a sheet;
a storage that stores a fixing temperature for each sheet type; and
a hardware processor that controls power supplied to the fixer by pulse-width modulation (PWM) control and controls a temperature of the fixer to the fixing temperature corresponding to the sheet type detected by the media sensor,
wherein
the media sensor is set such that emission from the media sensor does not interfere with the PWM control.

2. The image forming apparatus according to claim 1, wherein
the fixer includes a heater that generates heat by resistance heating.

3. The image forming apparatus according to claim 1, wherein
the fixer includes a heater that generates heat by induction heating.

4. The image forming apparatus according to claim 1, wherein
the PWM control is performed by high frequency chopping control.

5. The image forming apparatus according to claim 1, wherein
the media sensor is a high frequency sensor.

6. The image forming apparatus according to claim 5, wherein
the high frequency sensor is an ultrasonic sensor.

7. The image forming apparatus according to claim 5, wherein
the high frequency sensor uses a wavelength range that has no overlap with a wavelength range of noise generated by the PWM control.

8. The image forming apparatus according to claim 5, wherein
the high frequency sensor is disposed at a position separated by at least a predetermined distance from a switching element that performs the PWM control.

9. The image forming apparatus according to claim 8, wherein
a wavelength range of noise generated by the PWM control is within a predetermined range from 300 kHz.

10. The image forming apparatus according to claim 8, wherein
a wavelength range used by the high frequency sensor is within a predetermined range from 300 kHz.

11. The image forming apparatus according to claim 5, wherein
the hardware processor stops power control of the PWM control when the high frequency sensor detects the type of the sheet.

12. The image forming apparatus according to claim 11, wherein
the hardware processor controls power supplied to the fixer by ON/OFF control when the power control by the PWM control is stopped.

13. The image forming apparatus according to claim 11, wherein
the fixer further includes a temperature sensor that measures the temperature of the fixer and records a temperature profile, and
the hardware processor controls power supplied to the fixer in accordance with the temperature profile recorded by the temperature sensor after the high frequency sensor detects the sheet type.

14. The image forming apparatus according to claim 13, wherein
the hardware processor controls ON time of the PWM control in accordance with the sheet type detected by the high frequency sensor.

15. The image forming apparatus according to claim 11, wherein
the hardware processor controls power supplied to the fixer to heat the fixer for a predetermined period before stopping the power control of the PWM control.

16. The image forming apparatus according to claim 15, wherein
the fixer includes a plurality of heaters, and
the hardware processor supplies power to any one of the plurality of heaters when heating the fixer during the predetermined period.

17. A temperature control method for an image forming apparatus including
a media sensor that detects a sheet type,
a fixer that fixes the image on a sheet, and
a storage that stores a fixing temperature for each sheet type, the temperature control method comprising:
detecting the sheet by the media sensor; and
controlling power supplied to the fixer by pulse-width modulation (PWM) control and controlling a temperature of the fixer to the fixing temperature corresponding to the detected sheet type, wherein
the media sensor is set such that emission from the media sensor does not interfere with the PWM control.

* * * * *